United States Patent [19]
Caropreso et al.

[11] Patent Number: 5,972,164
[45] Date of Patent: Oct. 26, 1999

[54] PERSULFATE MIXTURES FOR REPULPING WET STRENGTH PAPER

[75] Inventors: Frank E. Caropreso, Sekillman, N.J.; Dean S. Thorp, Levittown, Pa.; Robert H. Tieckelmann, Trenton, N.J.

[73] Assignee: FMC Corporation, Philadelphia, Pa.

[21] Appl. No.: 08/972,072

[22] Filed: Nov. 17, 1997

Related U.S. Application Data

[62] Division of application No. 08/819,454, Mar. 17, 1997, which is a continuation of application No. 08/350,494, Dec. 6, 1994, abandoned, which is a continuation of application No. 08/030,939, Mar. 12, 1993, abandoned.

[51] Int. Cl.$^6$ .............................. D21C 5/02; A01N 3/00; B01D 17/06; C02F 1/72
[52] U.S. Cl. .......................... 162/7; 252/186.1; 210/750; 210/758
[58] Field of Search ........................ 252/186.1; 210/750, 210/758; 162/7

[56] References Cited

U.S. PATENT DOCUMENTS

| | | | |
|---|---|---|---|
| 1,840,413 | 1/1932 | Schmidt | 162/79 |
| 2,477,631 | 8/1949 | Levy et al. | 8/105 |
| 2,872,313 | 2/1959 | House et al. | 92/1.4 |
| 2,886,412 | 5/1959 | Lake et al. | 23/114 |
| 3,048,546 | 8/1962 | Lake et al. | 252/95 |
| 3,049,495 | 8/1962 | Jenkins et al. | 252/102 |
| 3,227,517 | 1/1966 | Leaver et al. | 23/50 |
| 3,361,618 | 1/1968 | McKinley | 162/8 |
| 3,640,885 | 2/1972 | Rhees | 252/156 |
| 3,736,224 | 5/1973 | Grayson et al. | 162/65 |
| 4,022,965 | 5/1977 | Goheen et al. | 536/56 |
| 4,105,827 | 8/1978 | Brichard et al. | 425/403 |
| 4,162,186 | 7/1979 | Wood et al. | 162/5 |
| 4,179,394 | 12/1979 | Dillenburg et al. | 252/186 |
| 4,233,171 | 11/1980 | McLaughlin | 252/99 |
| 4,243,480 | 1/1981 | Hernandez | 162/141 |
| 4,313,932 | 2/1982 | Watts | 424/62 |
| 4,343,679 | 8/1982 | DeCeuster et al. | 162/4 |
| 4,346,027 | 8/1982 | Van Genan | 524/377 |
| 4,381,969 | 5/1983 | DeCeuster et al. | 162/5 |
| 4,454,005 | 6/1984 | Stofko et al. | 162/12 |
| 4,466,861 | 8/1984 | Hultman et al. | 162/38 |
| 4,548,674 | 10/1985 | Hageman et al. | 162/5 |
| 4,699,623 | 10/1987 | Dubreux et al. | 8/11 |
| 4,756,800 | 7/1988 | Springer et al. | 162/64 |
| 4,773,966 | 9/1988 | Huynh | 162/78 |
| 4,973,641 | 11/1990 | Tsai et al. | 527/312 |
| 4,981,557 | 1/1991 | Bjorkquist | 162/168.2 |
| 5,067,966 | 11/1991 | Mager et al. | 8/405 |
| 5,120,397 | 6/1992 | Urushibata | 162/5 |
| 5,151,212 | 9/1992 | Bell et al. | 252/185.38 |
| 5,223,592 | 6/1993 | Hughes et al. | 526/240 |
| 5,229,447 | 7/1993 | Miyajima et al. | 524/377 |
| 5,232,604 | 8/1993 | Swallow et al. | 210/759 |
| 5,252,184 | 10/1993 | Tanaka et al. | 162/168.2 |
| 5,281,351 | 1/1994 | Romgo et al. | 252/99 |
| 5,366,593 | 11/1994 | Leg et al. | 162/72 |
| 5,447,602 | 9/1995 | Sajrel | 162/6 |
| 5,674,358 | 10/1997 | Espy | 162/7 |

FOREIGN PATENT DOCUMENTS 0585955  3/1994  European Pat. Off. .

OTHER PUBLICATIONS

H.H. Espy and G.W. Geist, TAPPI Proceedings, 1990 Papermakers Conference, pp. 147–149.
H.H. Espy and G.W. Geist, TAPPI Journal, 76(2), 139–142.
P.C. Kapdia, TAPPI Proceedings, 1992 Papermaker Conference, pp. 51–56.
D.O. House, Chem. Rev., 48, 185–203 (1962).
I. M. Kolthoff and I. K. Miller, J. Am. Chem. Soc., 23, 3055–3059 (1951).
Ullmann's Encyclopedia of Industrial Chemistry, 5th Ed., VCH, Weinheim, 1991, pp. 187–191.

*Primary Examiner*—Sharon Gibson
*Assistant Examiner*—Monique T. Cole
*Attorney, Agent, or Firm*—Patrick C. Baker; Bruce M. Monroe

[57] ABSTRACT

A method for repulping a wet strength paper is disclosed. Wet strength paper, which contains a wet strength resin, is agitated in water to form an aqueous slurry. An effective amount of a composition that contains a dry mixture of a persulfate and a base in the range of 90:10 to 10:90 is added either before or during agitation, and the slurry heated to produce pulp product for paper manufacture. The persulfate/base combination is capable of breaking down the wet strength resin and adjusting or maintaining the pH at a predetermined level without additional chemical treatment.

25 Claims, No Drawings

PERSULFATE MIXTURES FOR REPULPING WET STRENGTH PAPER

CROSS-REFERENCE TO RELATED APPLICATIONS

This application is a divisional application of Ser. No. 08/819,454, filed Mar. 17, 1997, allowed Aug. 5, 1997, which is a continuation of Ser. No. 08/350,494, filed Dec. 6, 1994, now abandoned, which is a continuation of Ser. No. 08/030,939, filed Mar. 12, 1993, now abandoned.

BACKGROUND OF THE INVENTION

1. Field of the Invention

The invention relates to paper reprocessing, and more particularly to the repulping of wet strength broke.

2. Background

Broke is waste or off-spec paper which is to be recycled. It is generally more desirable to recycle the broke by a process called repulping, than it is to merely dispose of the broke as waste paper.

In the repulping process, the cellulose fibers which make up the broke are sufficiently separated from the broke to make them usable for manufacturing paper. Repulping wet strength broke is difficult because such broke contains a wet strength resin (such as a polyamide-epichlorhydrin resin) added during paper production to enhance the strength of the paper produced so that the paper does not fall apart when used under wet conditions. The wet strength resin binds the cellulose fibers together, forming a water impervious coating, which impedes the repulping process goal of separating the cellulose fibers. Paper towels, tissues, food wrappings, and other paper products are typically treated with wet strength resins to prevent their deterioration when used under wet conditions. Typically, paper treated with wet strength resins will retain at least 15% of the paper's dry strength when wet. Paper without wet strength resin generally retains only 2–7% of its dry strength when wet.

Oxidation facilitates the break down of the wet strength resin to permit separation of the cellulose fibers. Traditionally, hypochlorite, particularly sodium hypochlorite, has been used by paper mills in the repulping of wet strength broke to oxidize the wet strength resin to facilitate fiber separation. When so used, hypochlorite oxidizes the wet strength resins within a narrow, carefully maintained pH range and within a temperature range of from about 122° F. (50° C.) to 150.8° F. (66° C.). After broke has been successfully repulped, an antichlor is added to neutralize the remaining chlorine.

Environmental issues have been raised concerning the use of hypochlorite for repulping. These concerns relate to the formation of organic halides which are adsorbed by the pulp, chloroform emission, and the problem of adding toxic chlorinated hydrocarbons to the effluent stream. For these reasons, non-halogen containing compounds, such as persulfates have been used to oxidize wet strength resin during the repulping process.

SUMMARY OF THE INVENTION

We have discovered that persulfate salts used in conjunction with a carbonate, bicarbonate or sesquicarbonate enhances wet strength broke repulping performance by facilitating the separation of cellulose fibers from the broke. In addition, we have discovered that relatively uniform dry mixtures of persulfate and carbonate, bicarbonate or sesquicarbonate can be prepared which do not separate in storage containers, and which exhibit substantially increased handling safety over persulfate alone. Moreover, we have discovered that the ratio of persulfate to base can be adjusted to provide a neutral, acid, or basic pH during the repulping process for the oxidation of the wet strength resin. Such pH regulation by adjustment of the persulfate to base ratio in the combined product avoids the need for an additional process step for pH adjustment and permits a single package chemical treatment for repulping.

DESCRIPTION OF THE PREFERRED EMBODIMENTS

The use of the term "about" herein shall be inferred when discussing ranges, dosages, weight percent or other numerical designation, unless otherwise specified.

The term "persulfate" includes any persulfate salt including sodium persulfate, potassium persulfate, and ammonium persulfate, unless otherwise specified.

The terms "carbonate", "sesquicarbonate" and "bicarbonate" include the alkali, the alkaline earth and the ammonium salts of carbonate, sesquicarbonate or bicarbonate.

The term "base" as used herein means a carbonate, a sesquicarbonate, or a bicarbonate.

The term "dry" indicates a composition or substance which does not feel moist to the touch. A dry composition can have water of hydration.

All percents are weight percent unless otherwise expressly specified.

The term "owf" is a dosage term which means based on the dry weight of fiber.

Composition

The compositions of this invention are designed for repulping wet strength broke and include a persulfate and a base such as carbonate, bicarbonate, or sesquicarbonate. An effective ratio of persulfate to the base should be used. A persulfate to base ratio of from 10:90 to 90:10 is effective, although a composition having a ratio outside this range can be effective depending on use conditions such as pH, the type or quantity of oxidizable material, and temperature. A persulfate to base ratio of from 60:40 to 90:10 is more preferred, and a persulfate to base ratio of from 70:30 to 80:20 is most preferred.

The persulfate to base ratio is based on the weight of the sodium salts of the persulfate and the base unless otherwise specified.

Examples of specific compounds included as bases include the following: sodium carbonate, sodium bicarbonate, potassium carbonate, potassium bicarbonate, calcium carbonate, sodium sesquicarbonate, potassium sesquicarbonate, and the like.

The Process

The compositions of this invention can be used to repulp broke. The repulping process is broadly described as follows: Water and broke are placed in a vessel, and agitated. Agitation consists in using a mixer/shearer such as are commonly used in the industry to mix the broke, water, and chemicals in the repulping operation, as well as to comminute the broke. The use of a mixer/shearer or a mixer plus a shearer are equivalent operations in repulping. The persulfate and base can be added prior to, or during agitation.

Different types of site addition can be used. The persulfate and the base can be mixed on site in dry form and fed as a dry mixture. The persulfate and the base can be added simultaneously to the repulping mixture as a dry powder, a slurry, a solution, or other form which one of ordinary skill in the art could put into practice without undue experimentation on the basis of the informaton provided herein. Alternatively, the base can be added first, followed by persulfate addition.

The repulped broke may be introduced directly into the paper making process as a slurry without further modification. Paper can be made from the repulped broke by separating the cellulose fibers from the slurry and introducing the fibers to a fourdrinier upon which paper is made.

Temperature

The persulfate/base combination works best if the temperature of the system is greater than 122° F. (50° C.). A temperature within the range of 122° F.(50° C.) to 167° F. (75° C.) is generally sufficient to activate and support the oxidation of the wet strength resin during repulping. Higher temperatures can be used, but are generally not required.

Time

Efficacy is improved if the resulting mixture is agitated for sufficient time to defiber the broke to produce a satisfactoy pulp. The time can vary depending on factors such as concentration of the persulfate and base, amount of oxidizable material, pH, and temperature. The use of the persulfate/base composition as a dry blend provides a significant time advantage over the use of persulfate alone or base alone. Time reductions greater than 20%, some greater than 50%, and others greater than 100% have been experienced. The time variable can be optimized by one of ordinary skill in the art on the basis of the information herein disclosed.

pH

In addition to time, pH can be controlled. Although a wide pH range is usable, the repulp time can be affected by the final system pH. A final pH compatible with plant systems is preferred. It is desirable to select a pH range which optimizes the repulping process. However, many times pH control also reflects the desirability of obtaining a final pH for the system which is compatible with other stages of paper production. For example, when a satisfactory pulp is produced, the process water is typically mixed with processed pulp from other sources, which may have acid, neutral, or base pH's. Or water from such other processes may be used as the makeup water for the broke repulping process.

Measures can be taken to avoid the addition of chemicals at each process transition for pH adjustment. This is achievable using the compositions of this invention as follows:

The ratio of persulfate to base can be selected to provide a neutral pH effect. That is, as the persulfate is consumed during the repulping process, bisulfate is produced. A neutral pH effect is achieved by adjusting the amount of base used to offset the reduction in pH attendant acid production during repulping. Normally, the bisulfate produced from the persulfate is the only acid which need be considered. However, if large amounts of other acids are produced from decomposition of the fiber or the resin, those acids may have to be considered.

Alternatively, if the pH of one process, e.g. the paper making process, differs from the pH of the wet strength broke repulping process, adjustments in pH can be made for the repulping process by varying the persulfate:base ratio to avoid any need for subsequent pH adjustment. Thus, acid, neutral or alkaline paper making processes can be accommodated without requiring an additional pH adjustment step. These adjustments can be achieved by one of ordinary skill in the art looking at the guidelines set herein. Consideration would be given to the actual pH and alkalinity of the system to be adjusted and to the acid generated and additional alkalinity provided by the addition of a formulated persulfate/base product.

Dosage

Also, an effective dosage of the composition is desired. Dosages of greater than 0.5% owf (owf means based on the dry weight of dry fiber or broke) are generally effective. The effective dosage is dependent upon system conditions, and can be determined by one of ordinary skill in the art based on the information disclosed herein. A preferred dosage is 1% to 15% owf. A more preferred dosage is 2% to 12% owf. Higher or lower dosages than the ones specified herein can be effective depending on the change in system parameters.

The parameters indicated above, are useful in repulping wet strength broke. A standardized procedure for accomplishing this is provided below.

Procedure for Repulping Wet Strength Broke

The breakdown of the resin used in wet strength broke is accomplished and measured by TAPPI method T-205-om81for repulping wet strength broke, as described below, including any variances.

1500 ml of 70° C. (158° F.) water is poured into a 2 liter Pyrex® glass beaker. The pH is adjusted and the desired repulping composition added. The resulting slurry is then poured into a preheated disintegrator vessel which is adjusted to a maintenance temperature of 65° C. (149° F.). 20 grams of pre-cut 1 inch broke squares are then added, and the disintegrator is started with continuous sample mixing at 2800 rpm. Temperature readings and 10 ml aliquots are taken every 5 minutes. These 10 ml aliquots are diluted to 200 ml with tap water, and then compared with standard samples for stages 1 through 6 (described below). Sampling continues until a stage 6 sample is obtained. If no stage 6 sample is obtained, sampling ceases at the end of 60 minutes. The pH, temperature and residual oxidizer measurements of the final sample are recorded.

During the above described TAPPI repulping method the pulp characteristics change from clumps of cut up resin coated paper (stage 1) to a relatively uniform mixture of free cellulose fiber (stage 6). These standards are described below.

Standard Samples for Stage 1–6

Repulp stages are determined by direct comparison to pre-made standards made according to the above TAPPI repulping method. These standards are characterized and designated as "stages", starting with stage 1 and ending with stage 6. The stages are defined as follows:

Stage 1 is characterized primarily as a broke having numerous large fiber flakes.

Stage 2 is characterized as a broke having having large flakes, and small flakes.

Stage 3 is characterized as a broke having primarily numerous small fiber flakes.

Stage 4 is characterized as a broke having primarily few small flakes, and numerous bonded fibers.

Stage 5 is characterized as a broke which primarily has finely separated fibers and a few bonded fibers.

Stage 6 is characterized as a broke which has been repulped to finely separated fibers.

A fuller understanding of the above described stages is provided by the following review of the process.

The initial broke is a cut up paper composed primarily of numerous large fiber flakes, which is characterizable as being Stage 1. Or the initial broke is a roll of waste paper, which is comminuted by a blade, such as a high shear impeller, to a paper composed primarily of numerous large flakes. As the broke is repulped, it typically becomes increasingly smaller. Ideally, repulping produces a Stage 6 pulp composed of completly separated fiber. In practice, however, a Stage 5 product consisting primarily of separated fibers and a few bonded fibers can be acceptable.

The paper that is produced from repulped broke will be finer, the more complete the fiber separation in the pulp. Generally, the less completely separated the fiber, the greater degree of dumpiness and surface irregularity in the finished paper good.

The following examples further illustrate the invention without limiting the scope thereof.

EXAMPLE 1 pH of 1 % Solutions of Formulated Broke Treatment

The pH of a 1 % solution of a formulated product made according to this invention was determined as described in Table 1 below.

In the test procedure, one gram samples of formulated product were added to 99 grams of the water being evaluated. After 5 minutes mixing, the pH of the system was measured. The results are provided below and summarized in Table 1.

TABLE 1

| EX | (1) $pH_i$ | (2) $pH_f$ | (3) $pH_i$ | (4) $pH_f$ |
|---|---|---|---|---|
| 75% Sodium Persulfate/25% Sodium Sesquicarbonate | | | | |
| 1 | 5.07 | 10.22 | 7.49 | 10.03 |
| 2 | 4.50 | 10.26 | 7.23 | 10.02 |
| 75% Sodium Persulfate/25% Sodium Carbonate | | | | |
| 1 | 5.27 | 11.46 | 6.99 | 11.08 |
| 2 | 4.50 | 10.26 | 7.01 | 11.10 |

(1) pH of deionized water prior to addition of persulfate formulations.
(2) pH of deionized water five minutes after addition to formulations.
(3) pH of tap water prior to addition of persulfate formulations. Alkalinity of tap water = 80 ppm; total hardness = 110 ppm.
(4) pH of tap water five minutes after addition of formulations.

Table 1 above demonstrates that pH increases when a persulfate formulated according to this invention at 75% persulfate and 25% base is added to an aqueous solution.

EXAMPLE 2

Effect of Formulated Sodium Persulfate on pH Before and After Repulping Wet Strength Broke Repulping experiments were conducted in tap water. In these experiments the repulping formulation was added to a repulping mixture prepared according to the TAPPI method described above. The repulping formulations were dry blends of 75% sodium persulfate and 25% of either sodium sesquicarbonate or sodium carbonate as indicated in Table 2 below.

TABLE 2

| Formulation | Sodium Persulfate/ Sodium Sesquicarbonate | | | SP/Sodium Carbonate | | |
|---|---|---|---|---|---|---|
| (% OWF)(1) | (2)$pH_i$ | (3)$pH_a$ | (4)$pH_f$ | (2)$pH_i$ | (3)$pH_a$ | (4)$pH_f$ |
| 0.50 | 7.4 | 7.9 | 7.7 | 7.4 | 8.5 | 8.0 |
| 1.00 | 7.5 | 8.4 | 7.2 | 7.4 | 8.8 | 7.4 |
| 1.50 | 7.6 | 8.5 | 7.3 | 7.4 | 9.1 | 7.5 |
| 2.00 | 7.8 | 8.6 | 7.3 | 7.6 | 9.2 | 7.4 |
| 2.50 | 7.6 | 8.9 | 7.4 | 7.4 | 9.3 | 7.7 |

(1) % OWF = Addition of the formulated material based on the weight of the wet strength broke fiber.
(2) pHi = initial pH of tap water
(3) pHa = pH of the tap water after addition of treatment.
(4) pHf = Final pH of the wet strength broke solution after repulping was completed.

The experiments depicted in Table 2 show that a 75% persulfate, 25% base repulping formulation is self neutralizing for the tap water used. Normally, a decrease in pH would be expected due to the formation of acid bisulfate when persulfate reacts with the resin. The self neutralization phenomenon is beneficial. It keeps the repulping mixture relatively alkaline to faciltitate incorporation into new paper production. The higher pH permits the natural alkalinity of the system to aid in the repulping by swelling the cellulose fibers and in the oxidizing of the wet strength resin.

EXAMPLE 3

Formulated -vs- Unformulated Sodium Persulfate Repulping Efficacy

The efficacy of persulfate, sesquicarbonate, carbonate and their mixtures was tested using the TAPPI repulping method described above. In each instance the initial pH of a fresh repulping mixture was measured. A formulated additive was added to the repulping mixture and the time required to attain a Stage 6 pulp was determined, as was the pH at the time of attaining Stage 6. The data is reported in Table 3.

TABLE 3

| This study was conducted using tap water | | | |
|---|---|---|---|
| Formulation Additive 1 | Repulp Time Required To Reach Stage 6 (min.) | (2)$pH^i$ | (3)$pH_f$ |
| SP(4)/None | 10–15 | 6.85 | 4.67 |
| SP(4)/sesq(5) | 5 | 6.80 | 7.62 |
| SP(4)/Carb(6) | 7.5 | 6.84 | 9.06 |
| Sesq(5) | 20 | 6.75 | 9.10 |
| Carb(6) | 20 | 6.83 | 9.48 |

(1) All additions made at 2.5% on the weight of the wet strength broke fiber
(2) pHi = pH of the tap water before chemical additions
(3) pHf = pH of the pulp solution after Stage 6 was achieved
(4) SP = Sodium Persulfate
(5) Sesq = Sodium Sesquicarbonate
(6) Carb = Sodium Carbonate
The SP/Carb and the SP/Sesq were each 1:1 w/w compositions.

Table 3 demonstrates that the recommended pH for repulping and optimal repulping efficacy was achieved when persulfate formulated with base was used. The data in this table also demonstrates that persulfate formulated with sesquicarbonate is more effective for repulping than is persulfate formulated with carbonate: 30% improvements have been achieved.

EXAMPLE 4

Sodium persulfate is a very reactive oxidizer, and is regulated by the United States Department of Transportation because of the ability of persulfate to start and sustain fires by oxidation. As the Examples demonstrate, sodium persulfate used with sodium carbonate or sodium sesquicarbonate is very effective for repulping resin treated broke. In order to determine whether those actives can be safely packaged together, a burn study was conducted according to the test procedure provided by the United States Department of Transportation (DOT) Code of Federal Regulations, Volume 49, Part 173, Section 175.171, "Oxidizer, Definition". The data is provided in Table 4 below.

TABLE 4

DOT Sawdust Burn Study Results
Evaluation of Sodium Persulfate Formulations
with Sodium Carbonate or Sesquicarbonate

| Sample ID | Ratio (2) | Reaction Time (sec)(1) | | | Comments |
|---|---|---|---|---|---|
| | | ExpA(3) | ExpB(3) | ExpC(3) | |
| SP(4) | 1:1 | 128 | 141 | 136 | Burned completely |
| SP(4) | 4:1 | 54 | 48 | 50 | Burned completely |
| SP/SC(5) | 1:1 | 100 | 91 | 84 | Self extinguished (~25% burned) |
| SP/SC(5) | 4:1 | 35 | 42 | 49 | Self extinguished (~10% burned) |
| SP/SS(6) | 1:1 | 21 | 24 | 36 | Self extinguished (~5% burned) |
| SP/SS(6) | 4:1 | 14 | 21 | 19 | Self extinguished (~5% burned) |

(1) Time (sec) required for sample to burn completely or self extinguish.
(2) Ratio = sawdust:sample.
(3) Three experiments (replicates) were conducted; ExpA, ExpB and ExpC.
(4) SP = sodium persulfate neat material.
(5) SP/SC = formulation containing 75% sodium persulfate and 25% sodium carbonate 260 grade.
(6) SP/SS = formulation containing 75% sodium persulfate and 25% sodium sesquicarbonate.

The data in Table 4 demonstrates that sodium persulfate formulated with either sodium carbonate or sesquicarbonate has a very high resistance to combustion, and tends to be self extinguishing if combustion does occur. Testing according to the United States Department of Transportation (DOT) Code of Federal Regulations, Volume 49, Part 173, Section 175.171, "Oxidizer, Definition" indicates that these tested formulations would be classified a non-regulated material. Sodium persulfate in non-formulated form would be classified as an Oxidizer, that is, as a regulated material according to these tests.

EXAMPLE 5

The data in Table 4 shows that sodium persulfate formulated with either sodium carbonate or sodium sesquicarbonate is safer than sodium persulfate alone. However, this safety factor would be lost if the sodium persulfate separated from the mixture.

A study was conducted to evaluate the tendency of 75% sodium persulfate and 25% sesquicarbonate or 25% carbonate to segregate. A segregation ladder having a 45 slope and 9 separate chambers was utilized. A uniform mixture of 75% sodium persulfate and 25% of either carbonate or sesquicarbonate, as indicated below, was poured evenly down the segregation ladder. Each of the nine chambers was analyzed for persulfate.

The persulfate used in the study had a bulk density of 1.25 gram per cubic centimeter. The sesquicarbonate used in the study had a bulk density of 45 pounds per cubic foot. The carbonate used in the study had a bulk density of 48 pounds per cubic foot. The test results are provided in Table 5.

TABLE 5

Segregation Study - Results

Sodium Persulfate/Sodium Carbonate Formulation

<------Top                                    Bottom------>
of segregation ladder          of segregation ladder
Percent Sodium Persulfate

| area 1 | area 2 | area 3 | area 4 | area 5 | area 6 | area 7 | area 8 | area 9 |
|---|---|---|---|---|---|---|---|---|
| 76.28 | 76.30 | 76.94 | 75.93 | 76.74 | 75.82 | 76.68 | 74.38 | 75.26 |

Sodium Persulfate/Sodium Sesquicarbonate Formulation

<------Top                                    Bottom------>
of segregation ladder          of segregation ladder
Percent Sodium Persulfate

| area 1 | area 2 | area 3 | area 4 | area 5 | area 6 | area 7 | area 8 | area 9 |
|---|---|---|---|---|---|---|---|---|
| 77.95 | 78.81 | 76.85 | 76.82 | 77.20 | 77.82 | 76.96 | 76.47 | 72.28 |

Table 5 above directly demonstrates the attainability of uniform mixtures of persulfate with carbonates, and sesquicarbonates and indirectly demonstrates stability where the base is bicarbonate. Such mixtures are stable and do not have a tendency to separate. This stability was unexpected in view of the structural differences between the base particles and the persulfate particles, which result in the mixtures including relatively spherical particles and needle-like particles.

EXAMPLE 6

Acid Mill Water Formulation Study

A study was conducted to evaluate potential sodium persulfate formulations for repulping wet strength broke using acid mill water. Each formulation was also tested in water simulating neutral-alkaline paper mill water.

Optimal repulping results in neutral-alkaline paper mills have been achieved with a 75:25 SP/sodium sesquicarbonate formulation. Upon addition to the repulper, this formulation generally gives an initial pH of 9–10. Table 6 reports the results.

TABLE 6

| Formulation | Addition Level (1) | Alkaline Water pH(2) | Acid Water pH(3) |
|---|---|---|---|
| 75:25 SP/sesqui | 0.66 g | 9.18 | 6.52 |
| 75:25 SP/Na2CO3 | 0.66 g | 9.82 | 7.40 |
| 67:33 SP/sesqui | 0.83 g | 9.54 | 7.32 |
| 67:33 SP/Na2CO3 | 0.83 g | 10.14 | 9.75 |
| 50:50 SP/sesqui | 1.0 g | 9.85 | 9.46 |
| 50:50 SP/Na2CO3 | 1.0 g | 10.48 | 10.21 |
| 50:25:25 SP/sesqui/Na2CO3 | 1.0 g | 10.24 | 10.06 |
| 25:75 SP/sesqui | 2.0 g | 10.22 | 10.08 |
| 25:75 SP/Na2CO3 | 2.0 g | 11.06 | 11.02 |

(1) Addition level equivalent to repulp experiment with SP at 2.5% on the weight of the fiber.
(2) Initial pH of neutral-alkaline water = 7.3–7.5.
(3) Initial pH of acid water = 5.0–5.2

EXAMPLE 7

Two wet strength broke samples were repulped. Both were treated with a 75% persulfate/25% sodium carbonate composition. Sample 1 was a tissue paper which contained less wet strength resin than Sample 2 which was paper toweling. The results are provided in Table 7 below.

TABLE 7

| % owf | minutes |
|---|---|
| Sample 1 repulped to Stage 6 as follows: | |
| 2 | 20 |
| 4 | 15 |
| 6 | 12.5 |
| Sample 2 repulped to Stage 6 as follows: | |
| 2 | 50 |
| 4 | 45 |
| 6 | 40 |
| 8 | 35 |

This data shows that repulping time is a function of the resin levels in the broke being treated as well as the dosage levels of the persulfate/base composition. The higher the dosage level, the shorter the time required for repulping.

Eye irritation

Eye irritation studies were conducted. Those studies indicated that sodium persulfate formulated with either sodium sesquicarbonate or sodium bicarbonate on a 75/25 w/w basis were safe to use, but that if sodium carbonate was substituted as the base, substantial eye irritation could result.

We claim:

1. A method for repulping wet strength broke, comprising:
   combining wet strength broke and water, the wet strength broke comprising wet strength resin and cellulose fiber;
   agitating the wet strength broke and water to form an aqueous slurry;
   adding an effective amount of a composition comprising a dry mixture of a persulfate and a base, said base selected from the group consisting of alkali, alkaline earth or ammonium carbonate, bicarbonate or sesquicarbonate to the aqueous slurry for breaking the resin; and
   heating the aqueous slurry to an effective temperature for oxidation of the resin for a period of time sufficient to produce pulp product for paper manufacture, wherein:
   the persulfate and the base have a persulfate to base ratio within the range of 90:10 to 10:90: and
   the composition is added prior to, or during, agitation.

2. The method of claim 1 wherein 0.5% to 2.50%, based on the weight of the wet strength broke fiber, of the composition is added, and wherein the ratio of persulfate to base is selected to offset the acidity produced when the persulfate oxidizes the resin, whereby there is substantially no pH change resulting from repulping.

3. The method of claim 1 wherein 0.5% to 2.50%, based on the weight of the wet strength broke fiber, of the composition is added, and wherein the ratio of persulfate to base is selected to produce a predetermined final pH for the repulping process.

4. The method of claim 1 wherein the amount of the composition added is 0.5% to 2.50%, based on the weight of the wet strength broke fiber, and agitating occurs for a time sufficient to produce at least a Stage 5 pulp according to the TAPPI method T-205-om81.

5. The method of claim 4 wherein the composition is a substantially uniform dry mixture which is combustion resistant and self extinguishing when ignited.

6. The method of claim 5 wherein the base is selected from the group consisting of sodium carbonate, sodium bicarbonate, and sodium sesquicarbonate.

7. The method of claim 6 wherein the persulfate is selected from the group consisting of sodium persulfate, potassium persulfate, and ammonium persulfate.

8. The method of claim 1 wherein the composition is a substantially uniform dry mixture which is combustion resistant and self extinguishing when ignited.

9. The method of claim 8 in which the aqueous slurry is heated at a temperature of at least about 50° C.

10. The method of claim 9 wherein the base is selected from the group consisting of sodium carbonate, sodium bicarbonate, and sodium sesquicarbonate.

11. The method of claim 10 wherein the persulfate is selected from the group consisting of sodium persulfate, potassium persulfate, and ammonium persulfate.

12. The method of claim 1 wherein the persulfate to base ratio is from about 60:40 to about 90:10.

13. The method of claim 12 wherein the base is selected from the group consisting of sodium carbonate, sodium bicarbonate, potassium carbonate, potassium bicarbonate, calcium carbonate, sodium sesquicarbonate, and potassium sesquicarbonate.

14. The method of claim 13 wherein the composition is a substantially uniform dry mixture which is combustion resistant and self extinguishing when ignited.

15. The method of claim 14 wherein the persulfate to base ratio is from about 70:30 to about 80:20.

16. The method of claim 15 wherein the persulfate is selected from the group consisting of sodium persulfate, potassium persulfate, and ammonium persulfate.

17. The method of claim 16 wherein the persulfate to base ratio is selected to produce a final pH of 7.2 to 8.0.

18. The method of claim 3 wherein the predetermined final pH is 7.2 to 8.0.

19. A method of repulping wet strength broke, comprising:
   a) preparing an admixture comprising
      i) wet strength broke comprising wet strength resin and cellulose fiber,
      ii) water,
      iii) a base selected from the group consisting of sodium carbonate, sodium sesquicarbonate, and sodium bicarbonate, and
      iv) a persulfate selected from the group consisting of sodium persulfate, potassium persulfate, and ammonium persulfate;
   b) heating the admixture to at least about 50° C.;
   c) agitating the admixture for a sufficient time to oxidize the wet strength resin and repulp the broke to produce at least a Stage 5 pulp according to the TAPPI method T-205-om81;
   wherein:
   the total amount of persulfate and base added 0.5% to 2.50%, based on the weight of the wet strength broke fiber; and
   the persulfate and the base have a persulfate to base ratio within the range of 90:10 to 10:90.

20. The method of claim 19 wherein the ratio of persulfate to base is selected to offset the acidity produced when the persulfate oxidizes the resin, whereby there is substantially no pH change resulting from repulping.

21. The method of claim 19 wherein the ratio of persulfate to base is selected to produce a predetermined final pH for the repulping process.

22. The method of claim 21 wherein the predetermined final pH is 7.2 to 8.0.

23. The method of claim 21 wherein the persulfate to base ratio is from about 70:30 to about 80:20.

24. The method of claim 23 wherein the persulfate is sodium persulfate.

25. The method of claim 24 wherein the pH of 7.2 to 8.0.

* * * * *